Feb. 17, 1959           G. S. YOUNG           2,874,310

APPARATUS FOR CONTROLLING AN ELECTRIC POWER SUPPLY SYSTEM

Filed Nov. 1, 1956                              4 Sheets-Sheet 1

INVENTOR.
Glenn S. Young
BY
Thos. E. Sedfield
ATTORNEY.

INVENTOR.
Glenn S. Young
BY
ATTORNEY.

United States Patent Office 2,874,310
Patented Feb. 17, 1959

2,874,310

APPARATUS FOR CONTROLLING AN ELECTRIC POWER SUPPLY SYSTEM

Glenn S. Young, Kansas City, Kans.

Application November 1, 1956, Serial No. 619,871

40 Claims. (Cl. 307—34)

The present invention relates in general to electric power supply systems of the public utility type, and it deals more particularly with an improved method of and apparatus for controlling the supply of electric service over the distribution lines of such systems. This application is a continuation-in-part of my application Serial No. 444,273, filed July 19, 1954, now Patent No. 2,771,558, issued November 20, 1956.

As pointed out in my prior application, one of the major problems which has concerned electric utility companies over the years is an economic one stemming, in the case of each community or network of communities, from the necessity of providing generating facilities and distribution networks that are ample by a safe margin to meet periods of peak electrical demand, yet which are used to full capacity only a relatively small portion of each day. Generating facilities which are idle or held in "stand-by" capacity during off-peak periods obviously produce no customer revenue, so considering the capital investment they represent as well as the non-operating costs involved in holding them in reserve, the economic inefficiencies in a typical day's operation are self-evident.

The problem is made more acute by the growing trend on the part of residential customers toward installing and using more and more intermittently operated "convenience" equipment and appliances which require high kilowatt capacity when in operation but which use relatively few kilowatt hours per year. The increasing popularity of air conditioning affords a prime example. The air conditioning load is seasonal in character and usually is of short duration, the maximum demand occurring only during the few hours of highest outdoor temperature; nevertheless, because of the high motor starting currents involved in room-type (¾ to 1 horsepower) and central (3 to 5 horsepower, and higher) air conditioners, larger distribution transformers and secondary conductors are required in order to avoid voltage disturbances that might otherwise cause dimming of lights, faulty television reception, etc. Again, electric clothes driers enjoy greater public acceptance than, say, electric water heaters—and unfortunately a clothes drier represents about twice the connected load of the average water heater, yet uses less than one-fourth the number of kilowatt hours on an annual basis. When contrasted with the longer hour use of lighting, refrigeration (¼ horsepower) and deep freezers (⅓ horsepower), it is apparent that the trend is toward appliances with higher kilowatt ratings but lower kilowatt hour use.

In utility parlance, this means a lower system load factor of higher peak loads and less hours of use. Stated differently, it requires more kilowatts of generating and distribution capacity, with less kilowatt hours in proportion—and kilowatts of capacity are much more costly to supply than kilowatt hours. Utilities have always endeavored to encourage use of offpeak power, but now, to a greater extent than ever before, it is becoming critically important for them to create and encourage markets for kilowatt hours that can be manufactured and delivered by existing facilities or minor additions thereto. Only by so doing can more of the utility's gross revenues becomes net revenues.

The present invention is directed to this problem, and its need is particularly evident in connection with supplying electric service to residential customers.

There is an increasing desire on the part of residential customers for an all-electric home—a home which has not only air conditioning, an electric clothes drier and the more common appliances that are a part of modern living, but also electric house heating and water heating. However, existing rates make the use of electricity for house heating and water heating prohibitively expensive from the point of view of most customers. This may best be understood if it is realized that the present national average use of electric energy by residential customers is 2,700 kilowatt hours per year, while the all-electric home in an area with a 5,000° day heating season will consume approximately 25,000 kilowatt hours per year, or more than ten times the present average.

To meet competition in the house heating and water heating market, the utility company must sell electric energy for around 1¢ to 1½¢ per kilowatt hour. With the many advantages of electric heat, there is a very large market for it at this price in the case of many houses that are well insulated.

But the all-electric home creates problems for the utility that at the present time are far from conducive to the sale of low-cost electric energy. The average size well-insulated house will require 12 to 15 kilowatts in heating elements to maintain desired temperature in cold weather. This is four or five times the present demand load of the average residential customer.

Now, electricity cannot be stored economically but must be manufactured, delivered and used instantaneously; since the utility therefore must have a manufacturing and delivery system with adequate capacity to serve the peak load conditions (and with adequate reserve capacity for emergencies and normal load growth) it is readily apparent that a house heating market of only 10% saturation would require the utility to increase its investment for additional facilities to serve the load if the house heating load is unrestricted as to time of use. Such added investment in view of prevailing high prices for equipment, labor, fuel and taxes plainly is not conducive to lower rates for service.

Accordingly, it is most important for the utility to satisfy this vast potential market with existing facilities or with a minimum addition of new facilities, since fixed charges on investment represent one of the major costs of electric utility operation. With this and other factors in mind, the fundamental objective of my invention is to enable the utility to so control the utilization by its customers of certain of its electric energy output as to greatly improve the economic efficiency of operation, with a commensurate reduction in the cost of energy utilized by the customer under such control.

Stated differently, it is my purpose to enable a utility supplying the customary type of electric service to supplement such service with an additional or auxiliary type of electric service that is automatically controlled with respect to the time of delivery to the consumer's utilization equipment.

Broadly speaking, the object of the present invention therefore is to provide a method of and apparatus for controlling the time of delivery of electric service to certain classes of consumer's utilization equipment; such utilization equipment may consist principally of electric heating elements of the resistance type, but this invention is not necessarily limited to electric heating equipment.

More specifically, the object of the invention is to so control the supply of electric service to certain classes of consumers' utilization equipment that during periods of peak demand the utility's generating and distribution facilities will automatically be relieved of all or part of the load that might otherwise be imposed thereon by the classes of equipment in question, the delivery of service to such equipment being deferred or curtailed until the peak period is past in order to obtain a more uniform distribution of the total load imposed upon the generating and distribution facilities in the course of any twenty-four hour day. As previously suggested, there are many types of electrical utilization equipment that can function on this conditionally deferred basis with little or no inconvenience to the consumer—complete house heating systems, auxiliary room heaters, clothes driers, water heaters and garbage incinerators to mention a few.

By controlling the energy input to certain types of consumers' utilization equipment so that such energy input will occur at times when off-peak capacity is available in the utility's generation and distribution system, the utility can make far greater and more efficient use of its facilities; this in turn will increase the utility's system load factor or the number of hours per year the system's facilities are used, with a resultant increase in the net revenue.

The benefits to be realized by my invention thus will be obvious. So far as the use of electricity for house heating and water heating is concerned, it will improve the utility's competitive position with respect to other fuels. So far as the acute seasonal problem posed by air conditioning is concerned, temporary curtailment or deferral of service to clothes driers, water heaters, incinerators, etc., during the hours when the peak air conditioning load demand exists makes it possible for the utility to meet this demand without the tremendous investment that otherwise would be required for enlarging the generating and distribution facilities, an investment utilities are understandably reluctant to make in view of the long periods that the additional facilities would be idle and non-revenue producing, while adding to the over-all costs of operation.

With these considerations in mind, it is an object of my invention to provide customers served by a common distribution network with an auxiliary service of the character referred to hereinbefore, which service is controlled in accordance with the magnitude of the total current drawn by the network from a main feeder circuit, or controlled in accordance with a representative portion of the total current.

Different distribution networks served by the same utility inherently differ somewhat from one another in their daily demand pattern, and another object of my invention is to control the auxiliary service rendered via each network in accordance with its own pattern; this achieves the effect of staggering, in point of time, not only the interruption or curtailment of the auxiliary service on the various networks, but also the restoration of the auxiliary service to full operating condition, the latter being important in minimizing the high reconnection peaks that would occur if all networks were controlled simultaneously.

According to my invention, the auxiliary service contemplated herein can be provided in one or both of two forms. In the first form, the normal service is interrupted during periods of peak demand and restored when the peak demand has passed, so that the service is in effect deferred in point of time. In the second form, the auxiliary service is curtailed or restricted during periods of peak demand but not completely interrupted.

A further object is to provide a simple and economical form of control apparatus which can readily be installed in existing distribution networks to adapt them for provision of the aforementioned auxiliary service, whether it be of the deferred type or the curtailed type, or both.

My control apparatus is adapted to be associated with the distribution transformer feeding the network and inasmuch as the power handling capability of such transformers varies with the temperature of the ambient air, an important feature of my invention resides in automatically varying the response characteristics of my control apparatus on the basis of ambient temperature in order to continuously maintain an approximate match between the characteristics of the control apparatus and the power handling capability of the transformer with which it is associated. In this way, I am able, by means of my control apparatus, to govern the auxiliary service in accordance with the relationship existing at any given time between the power being drawn from the distribution transformer and the power-handling capability of the transformer at that time.

In brief, my invention contemplates the use of variations of the ampere load imposed by a distribution network on the utility's feeder for actuating switch mechanisms associated with a customer's auxiliary service circuit in such a way as to control the voltage supplied via said circuit to utilization equipment (e. g., heating elements at the customer's premises) thereby to control the load or wattage drawn by such equipment. It is well known that the wattage or power drawn by resistive loads varies in geometric ratio to the impressed voltage or, stated differently, that the wattage input varies as the square of the impressed voltage.

However, it must be borne in mind that the auxiliary service which is to be controlled in this fashion is supplied to the customer via the same distribution network that also supplies him with conventional unrestricted service, i. e., service which is free of any control so as to be always available. With this in mind, another important object of my invention is to provide means for adjusting the operational characteristics of my control apparatus in accordance with changes in the characteristics of the uncontrolled load on the network, in a manner which will provide for correct control of the auxiliary service. This adjustment may be made manually from time to time, as needed, by the utility's service personnel; however, a further feature of the invention resides in the provision of arrangements for making the adjustment automatically so that the control apparatus requires a minimum of attention on the part of service personnel.

Other objects of the invention, together with the features of novelty whereby the objects are achieved will appear in the course of the following description.

In the drawings which form a part of the specification and are to be read in conjunction therewith and in which like reference numerals refer to like parts of the various views.

Figure 2:
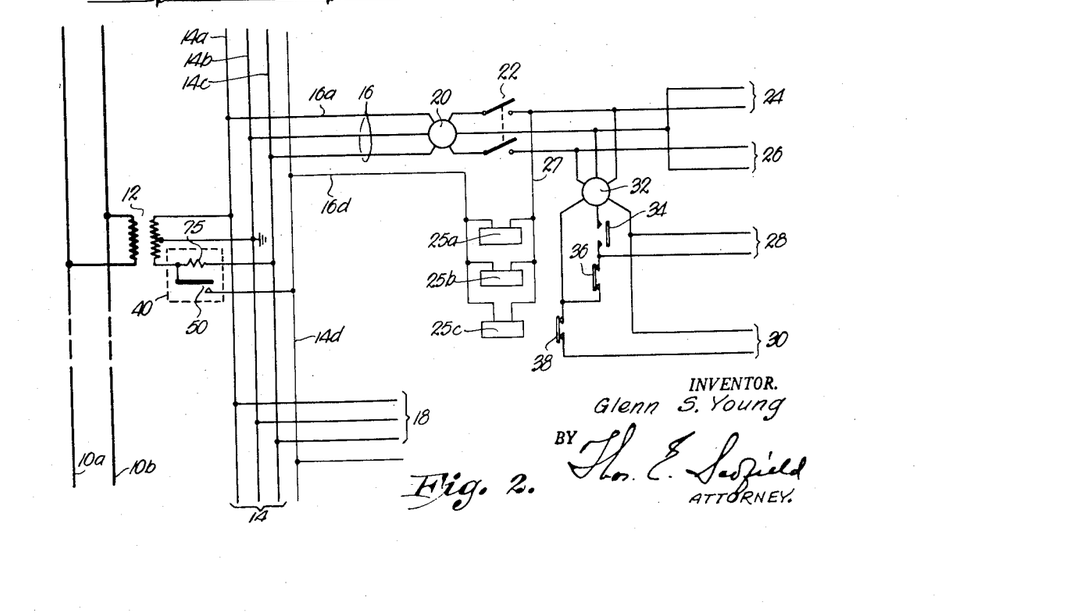
Fig. 2 is a schematic circuit diagram of a portion of a power distribution system employing a control device such as the one shown in Fig. 1.

Referring more particularly to Fig. 2, the numerals 10a and 10b indicate the conductors of a conventional high-voltage primary feeder to which the generating station or substation supplies alternating current energy at, let us say, 2,400 v. (It should be understood that this voltage and the other voltages referred to hereinafter are intended only to be illustrative and not limiting.)

Through the step-down distribution transformer 12, the primary feeder supplies energy to a low-voltage distribution network comprising a secondary feeder 14 having branch lines such as 16 and 18 extending to the premises of individual consumers, one of which is illustrated in the right-hand portion of Fig. 2. The distribution network is of the conventional three-wire type, the full voltage in the secondary winding of transformer 12 (which will be assumed to be 230 v. A. C.) being impressed across the outer conductors of the secondary feeder and the various branch lines connected thereto. Half of this voltage (115 v.) is available between either one of the outer conductors (14a or 14c) and the neutral center conductor 14b, the latter being connected to a grounded center tap on the secondary winding of transformer 12. It will be understood that other low-voltage distribution networks similar to the one described are independently connected to the primary feeder 10a, 10b by means of other distribution transformers, not shown.

Figure 1:
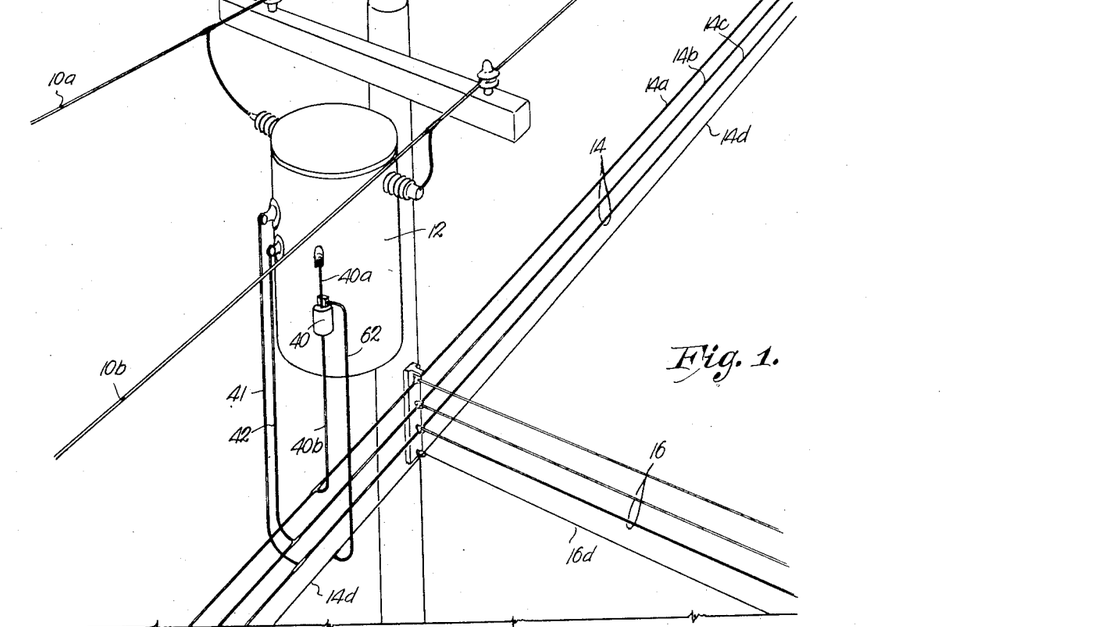
Fig. 1 is a perspective view of a conventional pole-mounted distribution transformer showing the manner in which one form of control device contemplated by the present invention is connected to an output or secondary lead of the transformer.

The particular distribution transformer under consideration here may be assumed to be pole-mounted in standard fashion (see Fig. 1), the primary feeder 10a, 10b being carried by a cross-arm above the transformer and the secondary feeder 14 by a bracket below same. In Fig. 1, the branch line 16 serving one consumer also is shown extending laterally from the secondary feeder toward the consumer's premises.

At the latter premises, branch line 16 is connected through a watt hour meter 20 and a main switch or circuit breaker 22 to a pair of 115 v. circuits 24 and 26, all as shown schematically in Fig. 2. Conventional unrestricted "full-time" service is available on circuits 24 and 26; to them it is contemplated the consumer will connect such electrical equipment as will not admit of deferred or curtailed service (e. g., lamps for household illumination, electric stoves, small appliances, etc.)

My auxiliary service is available to the consumer at lines 28 and 30. For convenience, line 28 can be termed a "deferred" service line while line 30 is a "modified deferred" or "curtailed" service line. By this is meant that, while in off-peak periods unrestricted service is continuously available at lines 28 and 30, the service at line 30 will be completely interrupted during periods of peak demand and resumed only when the peak has passed; the service at line 28, on the other hand, will be continued through peak periods but on a restricted or curtailed basis.

It should be understood that in a given case only the "deferred" service line or only the "curtailed" service line may be required to satisfy the consumer's needs, and in such instances the unneeded line may be omitted. However, under some circumstances it will be desirable to provide the consumers' premises with both auxiliary service lines and such will be assumed to be the case here. For the sake of illustration, then, let it be assumed that an electrically heated incinerator and a clothes drier are connected to line 30, since a considerable time lag in the operation of these devices will result in little or no inconvenience to the consumer. Also, let it be assumed that an electric water heater and one or more radiant space heaters for various rooms in the consumers' dwelling are connected to line 28 in order to avoid the possibility of there being a longer sustained interruption of service to these devices than can be bridged by "carry-over" heat generated by the devices prior to the interruption.

The power consumed over the auxiliary service lines 28 and 30 is measured separately at the watt hour meter 32 in order to facilitate charging therefor at a lower rate than that established for the continuous unrestricted service lines 24 and 26. Delivery of energy to lines 28 and 30 is controlled by contactors 34, 36 and 38 which are solenoid-actuated under control of the unit shown schematically at 40.

Control unit 40 is common to the various consumers' premises served by transformer 12, and preferably is mounted in close proximity to the transformer. It employs a normally open switch 50 which is adapted to be thermally actuated under control of the heat generated by a resistor 75. (For present purposes, it may be assumed that switch 50 is a snap-acting bi-metal element of the type disclosed in my prior patent application; in that application I also disclosed a resistor for heating the element, which resistor, however, was energized by a current transformer associated with the high-voltage primary winding of the distribution transformer, whereas the present heater 75 is in one of the low-voltage secondary leads of the distribution transformer as shown.)

The operation of the circuit arrangement illustrated in Fig. 2 is as follows: With the master switch or circuit breaker 22 at the consumer's premises closed, the conventional continuous service lines 24 and 26 will be energized at 115 v. as described hereinbefore. Also, the auxiliary service lines 28 and 30 will be energized at 230 v., the circuit for the latter line being completed by contactor 38 and that for the former being completed by contactor 36. The same condition will prevail at the premises of every other consumer served by the secondary feeder 14.

Heater 75 is made of an alloy whose resistance value is only slightly higher than that of the commercial copper conductor used for the secondary leads of the transformer, and until such time as the current flowing through the resistor reaches a critical value indicative of the existence of a peak load condition on the secondary feeder served by transformer 12, the heat generated by the resistor will be insufficient to close switch 50. When the critical value of current is reached, however, switch 50 closes, completing a circuit which extends from the lower end of the secondary winding of transformer 12 through contact 50, conductors 14d and 16d, the windings of solenoids 25a, 25b and 25c in parallel, conductor 27, the main switch 22, watt-hour meter 20, conductor 16a and conductor 14a back to the upper end of the secondary winding of the transformer. The solenoids thus are energized, closing contactor 34 and opening contactors 36 and 38. Opening of the latter contactor interrupts service to the "deferred" service line 30; opening of contactor 36 disconnects the 230 v. supply from the "curtailed" service line 28, while closing of contactor 34 connects the 115 v. supply to this line. Accordingly, unlike the service on line 30 which is completely interrupted responsive to closing of contact 50, the service on line 28 is continued, but at half voltage. The appliances connected to line 28 thus will draw only one-fourth of their normal power, and the load which they impose upon the primary feeder is correspondingly reduced without complete interruption of service to the consumer.

The foregoing condition of operation will obtain until such time as the feeder current flowing through resistor 75 drops to the critical value, which by reducing the heat generated by the resistor, permits contact 50 to reopen. When this occurs, solenoids 25a, 25b and 25c are de-energized, restoring contactors 34, 36 and 38 to the position shown, thereby to restore full 230 v. service to lines 28 and 30.

The operations just described with respect to the consumer whose premises is connected to the secondary feeder 14 by branch line 16 will, of course, be duplicated in the case of all other auxiliary service consumers who receive their electric power from the distribution transformer 12. However, the operation of switch 50 will have no effect upon the service received by other consumers than those served by the particular distribution network connected to the secondary of transformer 12; instead, other distribution transformers connected to the primary feeder 10a, 10b should be understood to have similar control facilities that are individual to each separate secondary distribution network.

The time of day at which a period of peak demand occurs will vary from network to network, and in the case of each network the load imposed upon the primary feeder by auxiliary services will be removed and restored in accordance with the demand experienced on that network. This results in an inherent staggering of the time at which the auxiliary service on the different networks is restored to full 230 v. operation, which is important in that it minimizes the high "reconnection" peak that would occur if auxiliary service on all networks were restored at the same time.

My arrangement has another feature of importance that should perhaps be mentioned at this point. As previously suggested, control unit 40 is located in close proximity to the pole-mounted distribution transformer with which it is associated; and being in an exposed location, the working parts of the unit should be enclosed as indicated schematically by dotted lines in Fig. 2 to shelter them from rain, snow, dust, drafts, etc.

The temperature within the enclosure is governed not only by the heater 75 but also to some extent by the modifying influence of the ambient air about the enclosure. Assuming, then, that switch 50 is adjusted to close responsive to a 100 ampere current flow through resistor 75 when the outdoor temperature stands at, say, 80° F., it will not close at the same current flow in 10° F. weather; rather, a higher value of current will be required to effect closing of the switch under the latter circumstance because, to offset the cooling effect of the lower ambient temperature, resistor 75 must generate more heat in order to acutate the switch. The end result of this, of course, is that in cold weather the auxiliary service lines 28 and 30 will at times be maintained at full 230 v. despite the fact that the total load on transformer 12 has exceeded the value at which the auxiliary service would have been interrupted or curtailed if the ambient temperature were higher.

Now, it might appear at first blush that this would lead to serious overloading of the distribution transformer in periods of peak demand when same occur in cold weather. Actually, such is not the case for the reason that the power-handling capability of an electric distribution system increases as the ambient temperature decreases; at 10° F., for example, a transformer such as 12 is capable of carrying 150% of its rated capacity, or more. What my control device actually does, then, is to automatically adjust or accommodate itself to changes in the power-handling capability of the distribution facilities in such fashion that, whatever the ambient temperature may be, maximum advantage of the available distribution capacity will be made before the auxiliary service is interrupted or curtailed by closing of switch 50. This means shorter and less frequent periods of interruption or curtailment in cool weather, for it is then that the distribution system becomes capable of handling greater loads with complete safety. It is of obvious advantage both to the customer and to the utility to minimize interruption or curtailment of the auxiliary service as much as is possible without overloading or sacrificing the safety of the distribution facilities.

In the summer months, the load which is of primary concern to a utility is that imposed upon its facilities by the fast growing residential use of air conditioners, for while the maximum air conditioning demand is of comparatively short duration each day the peak created thereby tends to be very pronounced. It was primarily to meet situations such as this that in my prior application I provided a time-controlled overriding arrangement which was made effective to interrupt or curtail auxiliary service on all networks at certain critical times of day coinciding with the periods of acute demand on the system—this being done even in the cases of networks which were not excessively loaded at the time, to the end that the acute situation on the system as a whole might be relieved.

However, it has been discovered that when proper advantage is taken on the influence exerted by ambient temperature on my present control unit, I can dispense with the arbitrary time-controlled overriding arrangement and still obtain as good or better results in meeting the problem created by the accentuated air conditioning load peak. The reason for this is that the time of day at which the air conditioning load builds up to its maximum peak is directly related to the ascending outdoor temperature, and as the temperature rises, its effect upon my control unit is such as to progressively depress the network load value at which the unit will cut off or curtail auxiliary service. Thus, even in the case of a network whose demand is comparatively light at the time, the ambient temperature will assume a degree of control which in effect outweighs and overrides the influence of the then existing network load, whereby auxiliary service will be cut off or curtailed as rising outdoor temperature leads the system load as a whole toward a peak by stimulating increased use of air conditioners.

From the foregoing discussion it will be quite evident that ambient temperature is given a very influential status in governing the action of my control unit 40. The manner in which this is accomplished will become clearer in the course of the ensuing discussion of the physical construction of the unit.

I have previously mentioned that switch 50 of my control unit 40 can be a snap-acting bi-metal element of the type disclosed in my prior patent application. It will readily be apparent to those versed in the electric thermostat art, however, that many other kinds of temperature controlled switches can be employed. In practice I find it advantageous to use a conventional snap-acting switch, the operation of which is controlled by a conventional temperature sensitive element of the type having a bellows acted upon by a heat expandible fluid.

Figures 3, 4, 5:
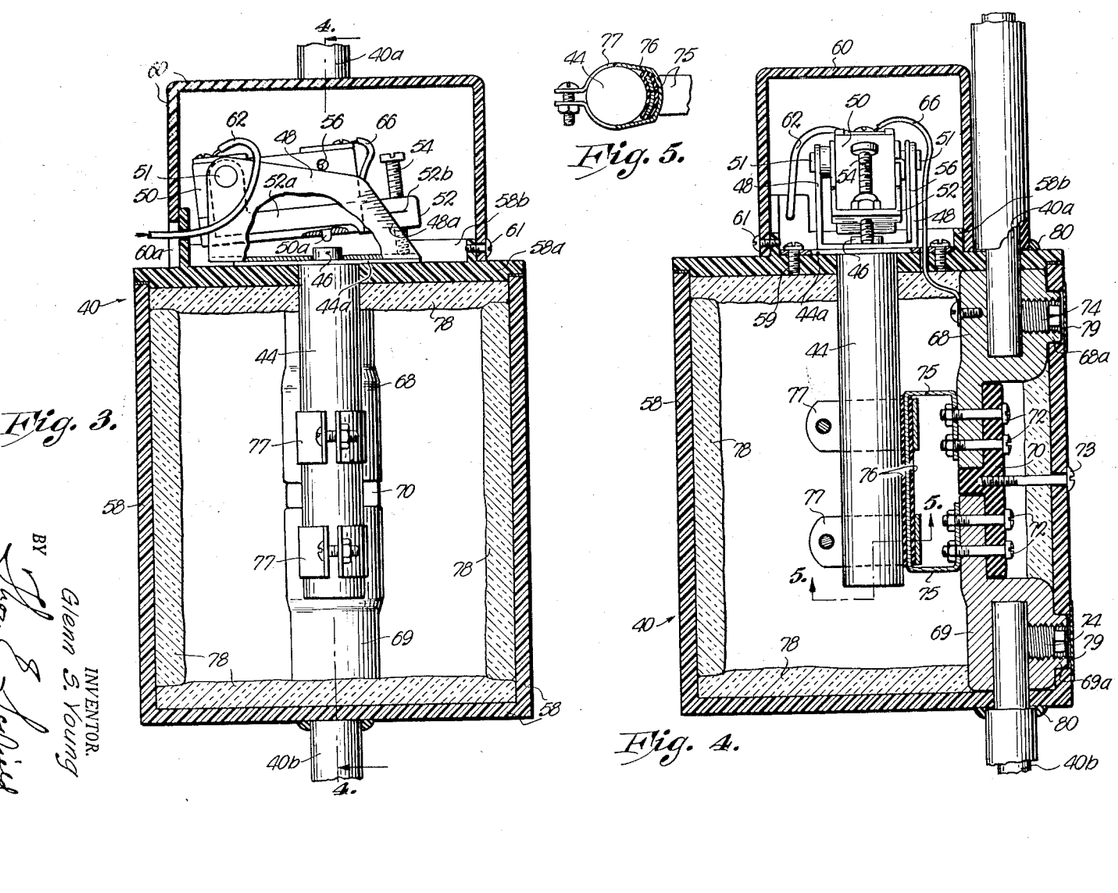
Fig. 3 is an enlarged view of the control device illustrated in Fig. 1, the housing being in cross section and some of the internal parts being broken away for purposes of illustration.
Fig. 4 is a cross-sectional view taken approximately along the line 4—4 of Fig. 3 in the direction of the arrows.
Fig. 5 is a cross-sectional view taken along the line 5—5 of Fig. 4 in the direction of the arrows.

One form of control unit 40 embodying an arrangement of this kind is detailed in Figs. 3 to 5, inclusive, and it is this unit which also is shown in connected relation to the distribution transformer 12 in Fig. 1. Referring more particularly to the detail views, the housing for the bellows mechanism of the thermo-sensitive device comprises a cylindrical barrel 44 having a mounting plate 44a secured to its upper end. A push rod or plunger 46 extending through an opening in the plate has its lower end connected to the bellows mechanism within the barrel in such a manner that the plunger will move upwardly with an increase in the temperature applied to the exterior of the barrel and downwardly with a temperature decrease.

Figure 8:
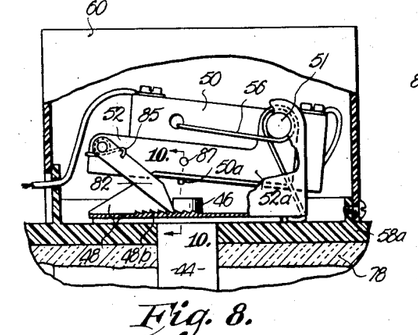
Fig. 8 is an elevational detail of the upper portion of my control device showing a modified form thereof, portions having been broken away for purposes of illustration.

Welded or otherwise secured to the mounting plate 44a is the apertured base of a generally trough-shaped frame 48, whose upstanding side walls taper from one end of the trough to the other. The snap-acting switch 50 is positioned between the two side walls and has its housing pivotally supported thereon by means of a transverse pivot pin 51. The free end of the switch housing rests in a cradle or carriage 52 having legs 52a that extend rearwardly along the sides of the housing and upwardly to the pin 51, on which they, too, are swingably mounted. The free end of the cradle is supported by an adjustment screw 54, this being threaded in the cradle and having its lower end seated on the bottom of the trough 48. By turning the screw, the end of the cradle can be raised or lowered, as desired, and since the free end of the switch housing rests in the cradle, such movement will also serve to adjust the position of the switch. A spring 56 like that shown more clearly in Fig. 8 is coiled around the pivot pin 51 with one end connected to the switch housing and the other to frame 48; this is tensioned to always urge the free end of the switch and cradle downwardly toward the position determined by adjustment screw 54.

The internal mechanism of snap-acting switch 50 conveniently may be of a general type disclosed in McLaren et al. Patent 2,521,017. As will be clear from my earlier description of Fig. 2, I prefer it to be a "normally open" switch which, as will be understood by those versed in the art, is adapted to close whenever light upward pressure is applied to the small button 50a projecting through the underside of its housing; this button is located directly above the end of plunger 46 so as to be actuated thereby upon upward movement of the plunger.

Barrel 44 of the temperature sensitive element is enclosed within a somewhat enlarged generally cylindrical housing 58. The housing has a centrally apertured top 58a encircling the upper extremity of the barrel, and the mounting plate 44a is secured to the upper surface thereof by means of screws 59 as shown in Fig. 4. A removable box-shaped cover 60 encloses the switch 50 and its supporting assembly, the lower margin of the cover normally being fastened to an upstanding flange 58b on the top of housing 58 by means of screws 61. Like housing 58, the cover 60 is made of electrical insulating material.

Through a vertically elongated slot 60a in one wall of the cover and through a complementary apertured portion of the upstanding flange 58b, there extends an insulated conductor 62; this has an end connected to one terminal of switch 50 as shown in Figs. 3 and 4, while the opposite end is connected to the control or pilot wire 14d (see Figs. 1 and 2) which is common to all of the consumers' premises served by distribution transformer 12. A second insulated conductor 66 extends from the other terminal of switch 50 through an aperture in the top of housing 58 to a conventional connector lug 68 (compare Fig. 2).

Connector lugs 68 and 69 are spaced laterally from the barrel 44 and they preferably have their butt ends seated against the top and bottom walls, respectively, of housing 58. They are held in rigid vertically spaced relation by means of an insulating spacer block 70 to which the proximate lug portions of the two connectors are secured by bolts 72. A screw 73 having its threaded end received in the spacer block 70 draws the rigid connector assembly tightly against the side wall of housing 78 and bosses 68a, 69a on the respective connectors are received in holes in the side wall of the housing to assist in positioning them as shown.

Each connector has a bore for receiving the bared end of a heavy insulated conductor (40a, 40b), the latter being clamped in place by set screws 74. Conductors 40a and 40b are vertically aligned, and it will be seen from Fig. 1 that the upper conductor 40a extends to one terminal of the secondary winding of transformer 12, while the lower conductor 40b connects to one of the wires 14a of the secondary feeder 14. The stiffness of conductors 40a and 40b is such that they will support the entire weight of my control unit, but if desired, additional support can be had simply by providing a suitable form of mounting bracket on the exterior of transformer 12.

Together, conductors 40a and 40b form one secondary lead of transformer 12, the other secondary leads being indicated by the numerals 41 and 42 in Fig. 1. In the case of the secondary lead on which my control unit is mounted, the upper section 40a and the lower section 40b are connected within the housing of the unit itself by means of the resistor 75 as will be understood from the earlier description of Fig. 2.

Referring to Fig. 4, member 75 comprises a strip of low-resistance metal alloy bent to C-shape and having its two ends fastened to the lugs of connectors 68 and 69, respectively, by means of the bolts 72. Being of short length, substantial cross section and low specific resistance (for example, 60 ohms per circular mil foot) this strip is capable of carrying the considerable current that must flow from the transformer to the secondary feeder via the secondary lead on which the control unit is mounted, without injury to the strip and without imposing any substantial additional load on the output of the transformer; at the same time, the resistance of element 75 is sufficient, considering the magnitude of the current flow therethrough, to make it capable of serving as a heater for the temperature-sensitive barrel 44. For this purpose the medial portion of heater 75 is bent to arcuate cross-section (see Fig. 5) conforming with the curvature of the barrel; provided with a thin wrap or coating 76 of electrical insulating material, this medial portion is clamped tightly against one side of the barrel by means of clamps 77.

The interior of housing 58 is lined with thermal insulating material 78, conventional fibreglass mat being satisfactory for the purpose. The housing is sealed against intrusion of moisture and in this connection after the set screws 74 have been tightened, I cover the openings in which they are located with an adhesive insulating tape, and I also seal the ends of conductors 40a, 40b where they enter the housing with mastic 80 or the like. Conventional gasketing may be employed to seal other openings or joints in the housing 58, or between the housing and cover 60, as needed.

It will be self-evident that the provision of connector lugs 68, 69 facilitates installation of my control unit in the field, while at the same time they make it possible for the entire unit to be small and compact for easy storage and handling prior to being put into use. However, it should be understood that if desired, conductors 40a and 40b can be permanently joined to the heater 75 at the factory, in which case the conductors will extend from housing 58 in pigtail form, so that they can be connected by the installation crew to the terminal of transformer 12 and conductor 14a of the secondary feeder as shown in Fig. 1.

The operation of the unit shown in Figs. 3 and 5 conforms in all respects to the description given earlier in connection with Fig. 2. That is to say, in a normal off-peak period the current flowing through heater 75 will be insufficient to close switch 50, and instead the end of the temperature controlled push rod 46 will be spaced below button 50a of the switch. However, with an increase in the current flow through heater 75, push rod 46 will move slowly upward until it finally reaches the critical point at which it engages button 50a and causes switch 50 to open, thereby to interrupt service on auxiliary service lines such as 30 (Fig. 2) and curtail service on the lines such as 28. As a consequence of this action, the current flow through heater 75 will of course be reduced, but the carry-over heat within the insulated housing 58 produces a time-lag in the response of the thermo-sensitive device 44, and this eliminates or minimizes recycling of the control unit.

The insulation 78 also serves to control the rate of heat dissipation from the enclosure 58 or, stated differently, serves to control the cooling effect which the ambient air about the enclosure exerts upon the interior thereof and consequently upon the operation of the thermo-sensitive element 44. By giving the insulated walls of housing 58 the correct heat transfer characteristics, it is possible to match the effect of ambient temperature upon my control unit with the effect of ambient temperature upon the load-handling capability of transformer 12, to the end that the capability of the transformer at any temperature may always be utilized with maximum efficiency for auxiliary service as well as for uncontrolled conventional "full-time" service. This matter has been dealt with more fully hereinbefore, so it will suffice here merely to point out that the current flowing through resistor 75 at the instant when push rod 46 engages button 50a will always be higher if the ambient temperature is low than it would be if the ambient temperature were high, and vice versa.

While my control unit thus can be regarded as self-regulating or self-adjusting with respect to the changes in ambient temperature that occur after installation, it nevertheless is necessary, of course, to give the unit an initial setting or adjustment at the time of installation; this is accomplished by means of screw 54 which can be turned to raise or lower the normal position of the switch-actuating button 50a. To facilitate making the adjustment, an index line 52b is provided on one wall of cradle 52 so that this may be set in desired relation to a scale 48a on the frame 48, the scale preferably being graduated in kilowatts. The setting can be based on an estimate or a measurement of load conditions existing on the transformer 12 before installation of my control unit.

With experienced and qualified personnel, satisfactory initial setting can be made in this fashion. However, estimates always are subject to human error and the matter fo making accurate preliminary measurements can be relatively expensive. Also, it will be understood that as the uncontrolled "full-time" load on distribution transformer 12 increases over the years, manual field readjustment proportional to the increase is advisable in order to avoid too frequent and too prolonged interruptions or curtailment of auxiliary service. Such manual readjustment is of course an added expense.

By a simple modification of the switch assembly, the human factor of load-estimating, the expense of making load measurements, and the time required for manual setting can be eliminated or greatly reduced. For an understanding of this modification, reference is made to Figs. 8 to 10, inclusive. The construction shown therein is exactly like that already described except in two respects:

(1) First, adjustment screw 54 has been eliminated and I have substituted therefor a swingable arm or prop 82 mounted on one side of cradle 52 by means of a pivot pin 84. Spring 85 coiled around the pin in the manner shown in Fig. 8 is lightly tensioned to urge arm 82 downwardly with only enough force to insure that its lower end is maintained in rather firm seating engagement with the bottom of the trough-shaped frame 48. The lower extremity of arm 82 is pointed and the portion of trough 48 engaged thereby is provided with serrations 48b which are made as small as possible but exaggerated in size in the drawing for the sake of clarity; in lieu of serrations, knurling or any other form of surface roughening may be used that will give the tip of arm 82 a non-skid seat.

(2) The only other departure from the construction previously described in connection with Figs. 3 and 4 is that shown in Fig. 10. As will be seen, button 50a of the snap-acting switch is encircled by a collar or bushing 50b which is anchored in the underside of the switch housing with its lower end extending downwardly into a shallow well 50c. The projecting portion of the bushing is externally threaded to receive an internally threaded nut 86, the exposed face of which has a convex curvature as illustrated.

Figure 9:
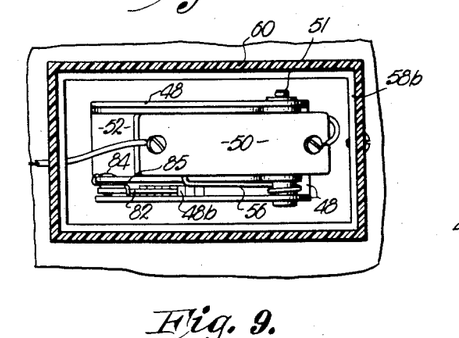
Fig. 9 is a sectional plan view of the same device as shown in Fig. 8.
Figure 10:
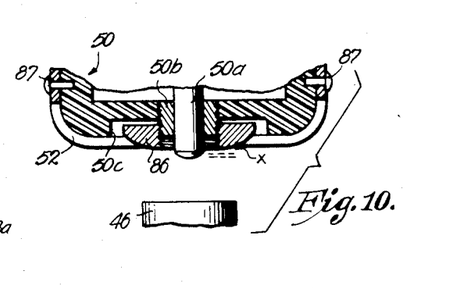
Fig. 10 is an enlarged cross section taken approximately along the line 10—10 of Fig. 8 in the direction of the arrows.

When a control unit having the modified assembly of Figs. 8 to 10 is installed as shown in Fig. 1, no initial adjustment of the position of switch 50 is required. Instead, bearing in mind that spring 56 is tensioned to always urge the free end of switch 50 downwardly about the pivot pin 51, the installer needs only to lift the free end of arm 82 momentarily against the force of the more lightly tensioned spring 85 and permit switch 50 to move downwardly to a position known to be somewhat below its correct position. When this has been done, the switch will automatically readjust and correct its own position under control of the load imposed upon the transformer 12 (Figs. 1 and 2) with which it is associated.

Considering the subsequent operations, let it be assumed that the network load on the distribution transformer builds up to a peak. At some point substantially below the maximum peak the end of the temperature-controlled push rod 46 will engage button 50a of the switch whereupon the switch will close and bring about an interruption or curtailment of the auxiliary services as previously explained. Despite this, the load on the distribution transformer will continue to rise (due, let us say, to the still increasing demand placed upon continuous "full-time" service lines such as shown at 24, 26 of Fig. 2) until the peak is reached. This will be reflected by a continuing upward movement of the temperature controlled pushed rod 46 after it engages and actuates button 50a of the switch.

The internal construction of the switch allows some overtravel of button 50a after it has been actuated, and accordingly the continued upward movement of push rod 46 brings its end into engagement with the convex underside of nut 86; from the time of engagement with this nut until the maximum peak of the network load is reached, the upward movement of push rod 46 will serve to displace the housing of switch 50 upwardly against the tension of spring 56 (Fig. 8). Cradle 52 is pinned to the switch housing as shown at 87, so as the free end of the switch housing moves upwardly, it will be self-evident from Fig. 8 that the lower extremity of prop arm 82 will travel in a leftward direction relative to its initial position. Thus, when the peak load condition has passed and push rod 46 begins to descend, arm 82 will prevent downward movement of the switch from its newly established position and it may be considered as having been properly readjusted in accordance with the peak network load stemming mainly from conventional continuous "full-time" service equipment and appliances.

On the initial resetting operation just described, the auxiliary services will of course have been cut off or curtailed much too far ahead of the arrival of the maximum peak load in point of time; however, the next time the load on the network builds up to peak condition, the initial resetting of the switch will have corrected this. Button 50a now will be engaged and actuated only a short distance ahead of the time that push rod 46 arrives at the maximum limit of its upward travel which, if the peak is of the same magnitude as the one preceding, will again bring the end of the push rod into engagement with nut 46 but will not cause it to exert any further upward force on the switch housing.

However, when on ensuing days or in ensuing years as a result of growth of demand on the network, peak load conditions are encountered which exceed previous peak loads in magnitude, the further upward advance of push rod 46 will serve in the same fashion as previously described to again readjust the switch housing upwardly to a new setting which in the case of each such readjustment will be maintained by arm 82. Accordingly, my arrangement obviates the need for periodic manual readjustment by field personnel of the utility.

Having in mind the tendency of network loads to grow rather than decrease over the years, it normally can be expected that all such readjustments will be in an upward direction and thus handled automatically by my device. However, if there should be such a change in the character of the network load as to call for a downward readjustment of the position of the switch, it is only necessary for the field personnel to trip lever arm 82 by lifting its free end so that the outer end of switch housing 50 will be permitted to descend; subsequent resetting in accordance with the peaks of the lower network load now will again take place automatically as already described.

For most networks the proper setting of switch 50 should be the position in which it will cut off or curtail the auxiliary service load at approximately 90% of the peak "full-time" service load of the network. Referring to Fig. 10 and assuming that the distance between the two dotted lines represents the displacement of button 50a which is necessary to operate the snap-acting switch 50, it will be seen that the distance X (between the upper dotted line and the underside of nut 86) represents the distance which the end of push rod 46 can travel after the auxiliary service load has been dropped or curtailed before it will reach the underside of the nut. From what has been said, it will be clear that as the load on the network builds up toward a peak, the distance X should be the distance that the push rod 46 will advance after 90% of the peak "full-time" load has been reached (at which point the auxiliary service load will be cut off or curtailed) and before the maximum peak is reached.

Now, the 90% figure given as exemplary will not hold for all networks and all conditions, inasmuch as the auxiliary service load in one network may comprise a larger or smaller proportion of the total load than is true in another network, and consumers' use habits may vary considerably from one network to another; to permit deviation from the 90% figure, therefore, I make it possible to vary the distance X by simply turning nut 86 in one direction or the other so as to advance it upwardly or downwardly on the threaded bushing 50b. This is an adjustment which normally can be made when my control unit is installed, after which it ordinarily will not need to be readjusted for the particular network with which the unit is associated.

Figure 11:
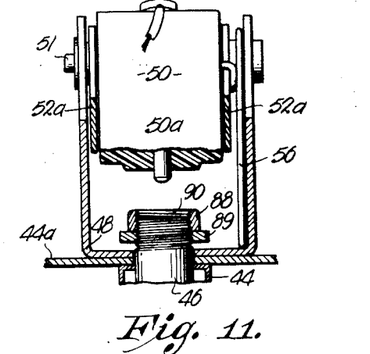
Fig. 11 is a sectional end elevation showing still another modification of the construction illustrated in Figs. 8–10.

Fig. 11 illustrates an alternate arrangement which permits making the same kind of adjustment. In this, button 50a of the snap-acting switch 50 merely projects through an integral boss on the underside of the switch housing. However, the upper end of push rod 46 is threaded to receive thereon an internally threaded collar 88 and a lock nut 89. The collar projects beyond the upper end of the push rod as shown, forming at the end of the push rod a shallow well 90 whose depth is somewhat less than the distance which button 50a projects below the boss on the underside of housing 50. Accordingly, upon upward movement of push rod 46, its end first will engage the button and actuate the switch, following which the upper end of collar 88 will, upon predetermined further movement of the push rod (corresponding to the distance X in Fig. 10), engage the boss on the underside of the switch housing.

By loosening lock nut 89, collar 88 can be turned in either direction to vary the effective depth of well 90, after which the lock nut should, of course, be retightened. This adjustment is for the same purpose as the adjustment of nut 86 described in connection with Fig. 10 and should be made with the same considerations in mind. Once made, the device of Fig. 11 will function in precisely the same fashion as that of Fig. 10, and it will be understood that either arrangement can be employed in the switch structure shown in Figs. 8 and 9.

Figure 12:
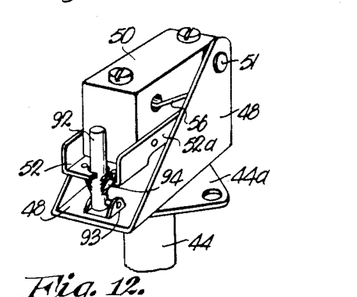
Fig. 12 is a perspective view showing a further modification of the construction illustrated in Figs. 8–10.

In lieu of using arm 82 for preventing downward movement of switch 50 after it has been elevated under control of the push rod 46, various other arrangements for preventing retrograde movement may be employed. One of these is shown in Fig. 12. In this, a post 92 loosely received in an opening in the cradle 52 has its lower end hingedly mounted at 93 on the base of the trough-shaped frame 48. A pair of light spring members 94 riveted or otherwise secured to the underside of the cradle have their downwardly converging inner ends tensioned to engage the sides of the post. If necessary, the sides of the post can be serrated, knurled or otherwise roughened as shown to aid the gripping action of the springs.

When an upward force is applied to the underside of the switch by means of push rod 46 as described earlier, springs 94 can slide upwardly along post 92 to permit upward movement of the free end of the switch and cradle assembly about pivot 51; however, the springs will prevent downward movement of the assembly so serve the same purpose as arm 82 in Figs. 8 and 9. When this arrangement for preventing retrograde movement is employed, it will be understood that the manner of applying an upward thrust on the underside of the switch 50 is the same as that described in connection with Figs. 8 and 9; in other words, the actuating means for the push button of the switch should be like that shown in Fig. 10 or in Fig. 11.

Figure 6:
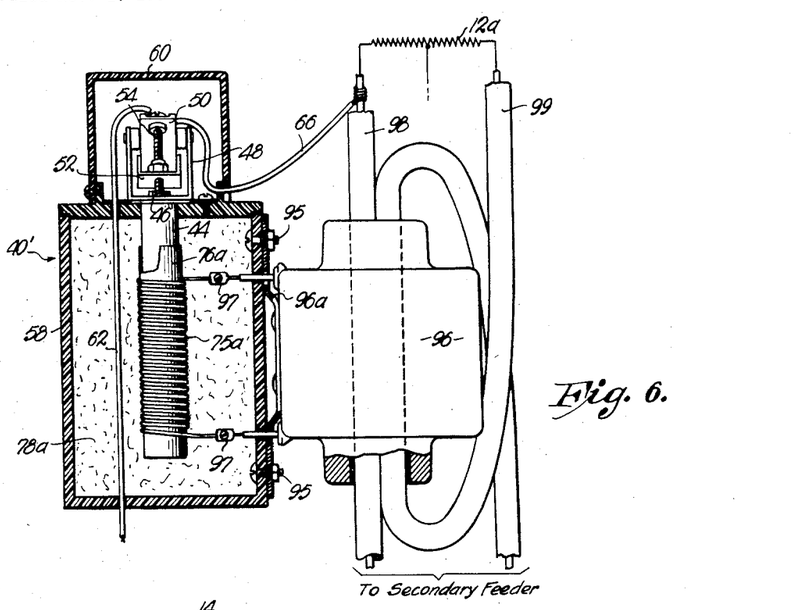
Fig. 6 is a sectional elevation of a modified form of control device contemplated by the present invention.
Figure 7:
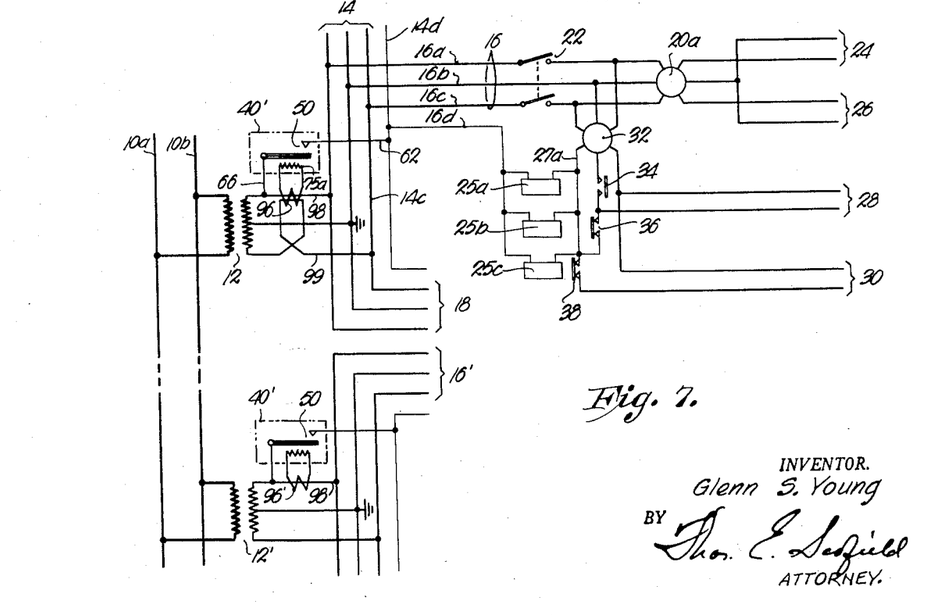
Fig. 7 is a schematic circuit diagram of portion of a power distribution system employing the device of Fig. 6.
Figure 13:
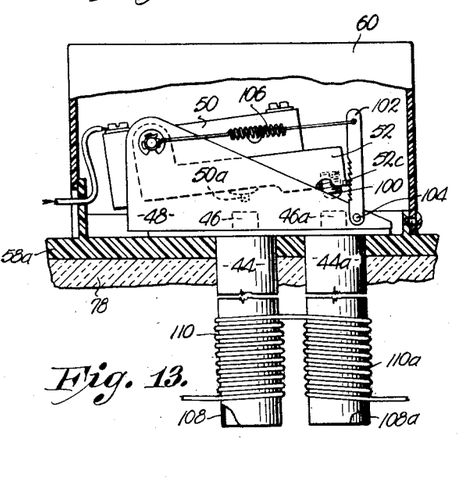
Fig. 13 is a detail view of the upper portion of my control device, showing an alternate form thereof.

Another alternative way of accomplishing the same result is shown in Fig. 13, but before describing this, it will be helpful to consider the modified form of control unit 40' disclosed in Figs. 6 and 7.

Referring first to Fig. 6, the switch 50 and its supporting assembly, as well as the temperature sensitive barrel 44 by which it is actuated, all are exactly as shown in Figs. 3 and 4, and similar reference numerals have been used to assist in correlating the corresponding parts in the respective figures. The switch and its supporting assembly are sheltered by a cover 60 as before, and the temperature sensitive element 44 is within a housing 58 which, in this embodiment of my invention, I find it convenient to completely fill with loose thermal insulation 78a, fibreglass or the like being suitable for the purpose.

The exterior of barrel 44 is covered by a thin sleeve 76a of electrical insulating material. Around this is wound a heating coil 75a which may be of Nichrome wire. The housing of my unit is secured by bolts 95 to the mounting bracket 96a of a conventional current transformer 96 so that the insulated terminal leads of the current transformer winding project through apertures in the bracket and housing to connect with the ends of the heater coil at 97.

The secondary winding of the usual distribution transformer is shown schematically at 12a, and the secondary leads extending downwardly from opposite ends of the winding to the secondary feeder of the network are shown at 98 and 99. Considering these, it will be apparent that my control unit 40' can conveniently be located adjacent the distribution transformer in much the same fashion as is the control unit illustrated in Fig. 1. Lead 98 passes directly through the open central bore of current transformer 96, while lead 99 is looped therethrough. This causes the current in the two leads to have an additive effect upon the output of transformer 96, inasmuch as current flow in the portions of the two leads encircled by the winding of the current transformer is always in the same direction at the same time.

One terminal of switch 50 is connected by an insulated conductor 66 to the secondary lead 98 as shown, while the other terminal of switch 50 is connected to an insulated conductor 62 which extends through the housing 58 to the control or pilot wire common to all of the consumers' premises served by the distribution transformer with which the control unit is associated.

This will perhaps be clearer from Fig. 7 which shows schematically the complete wiring arrangement. In many respects this is similar to the circuit shown in Fig. 2, and like reference numerals therefore have been used wherever appropriate. From the earlier description it will be understood that switch 50 normally is open, and consequently that the auxiliary service lines 28 and 30 at the consumer's premises normally are energized at the full 230 v. However, when an increasing load is imposed on feeder 14, more and more current flows through the distribution transformer leads 98 and 99, and the output voltage of the current transformer 96 will increase accordingly; the output of the current transformer is impressed upon the heating coil 75a (compare Fig. 6) which therefore generates more heat as the network load increases. This heat, applied to the barrel 44 of the temperature sensitive element, finally causes switch 50 to close, completing a circuit which extends from one end of the secondary winding of the distribution transformer 12 through conductor 66, switch 50, conductor 62, pilot wire 14d, conductor 16d, the windings of solenoids 25a, 25b and 25c in parallel, conductor 27a, watt-hour meter 32, main switch 22, conductors 16c, 14c and 99 back to the opposite end of the secondary winding of transformer 12. Solenoids 25a, 25b and 25c thus are energized responsive to the closing of switch 50, bringing about an interruption of the service on auxiliary line 30 and a reduction of the voltage on auxiliary line 28 from 230 v. to 115 v.

So far as the closing and opening of switch 50 is concerned, the resultant operation of the circuit arrangement shown in Fig. 7 is exactly like that which has been described in connection with Fig. 2. Also, in both arrangements the actuation of switch 50 is under control of a resistance heating element whose heat output at any given time reflects the output of the distribution transformer 12 (i. e., the network load) at that time. However, due to the difference in the manner of deriving the current for the respective heaters, there is a difference in the accuracy with which they reflect the network load.

Thus, it will be seen upon analysis that when the control unit of Figs. 6 and 7 is employed, the amount of heat generated by resistor 75a is a function of all of the network load, for all of the current drawn from the secondary winding of transformer 12 is measured by current transformer 96. On the other hand, when the control unit of Figs. 2–4 is employed, the heat generated by the corresponding resistor 75 is a function of all of the network load except that imposed on one 115 v. output of transformer 12, for the current in that one 115 v. leg of the output bypasses resistor 75.

Technically, then, the arrangement of Figs. 6 and 7 can be said to afford a more complete and accurate measurement of the network load, as a basis for controlling switch 50, than does the arrangement of Figs. 2–4. Actually, however, there is not as much disparity in the accuracy of the two arrangements as might be supposed. While it is true that the control unit of Figs. 2–5 measures the current in only one of the 115 v. output legs of the distribution transformer, it must be remembered that in the average network the two 115 v. legs normally are loaded almost equally; accordingly, a measurement of the load on one 115 v. leg, together with the 230 v. load on the transformer, affords a fairly representative indication of the total network load condition at any given time. Actual field tests show that the results obtained with the control unit of Figs. 2–5 closely approximate those obtained with the unit shown in Figs. 6 and 7, making it possible to obtain very satisfactory results with either one.

This being the case, it also will be evident that while the arrangement of Fig. 6 will give maximum accuracy, it is not absolutely essential that the conductor 99 pass through the bore of the current transformer at all. The current transformer can, in other words, be coupled with conductor 98 alone, as illustrated schematically in the lower portion of Fig. 7, where the winding of transformer 96' is shown encircling only one of the output leads of distribution transformer 12'. When this is done, it naturally measures the current flow in only that one lead (98) and the operational results, so far as the control exercised over switch 50 is concerned, will substantially duplicate those obtained with the Fig. 2 arrangement. Although these results are acceptable, I prefer the current transformer coupling arrangement shown in Fig. 6, because of the somewhat better accuracy of load measurement obtained therewith.

Parenthetically, it may be observed that by using the coupling arrangement of Fig. 6 it is possible without any sacrifice in accuracy to utilize a less expensive current transformer than was required according to my prior patent application, where the current transformer was coupled with the high-voltage primary lead of the distribution transformer, rather than with the low-voltage secondary lead, as here. Purely from a cost standpoint, the construction of Figs. 3 and 4 has the further advantage of requiring no current transformer at all. Use of a current transformer, on the other hand, has the advantage of greater flexibility of application, and it altogether avoids the necessity of making a cut or splice in the distribution transformer lead.

In the Fig. 6 unit I have shown an adjustment screw 54 similar to that of Figs. 3 and 4 for manually setting the position of switch 50. It will be understood, however, that the manual adjustment screw can be eliminated and the positioning of the switch accomplished by the automatic adjustment facilities discussed earlier in connection with Figs. 8 to 12, inclusive.

Fig. 13 shows another construction by which automatic setting of the position of switch 50 can be obtained. This unit is provided with a temperature sensitive element 44 whose push rod 46 is adapted to actuate button 50a of the switch, all as explained hereinabove. In addition to this, the unit has a second, similar thermo-sensitive element 44a whose push rod 46a is positioned to exert an upward thrust on a set screw 100 threaded in the free end of cradle 52. The assembly has the usual spring (not shown, but like spring 56 of Fig. 8) urging the free end of the cradle downwardly, but this movement is resisted under the influence of a lever arm 102 whose upper end is biased toward the left by a light tension spring 106. A knife edge 52c projecting laterally from the edge of cradle 52 cooperates with the toothed edge of lever 102 in such a manner as to permit the end of the cradle to move upwardly, but not downwardly, except upon manual disengagement of the lever from the knife edge. The anti-retrograde prop 82 of Fig. 8 can of course be substituted for this arrangement if preferred.

The lower portions of the temperature sensitive barrels 44 and 44a are covered with sleeves 108 and 108a, made of electrical insulating material; and around these are wound the heating coils 110 and 110a, the two coils conveniently being formed of a single, continuous piece of nichrome wire having its ends connected to the terminals of a current transformer such as 96 (Fig. 6). The two heater windings thus are adapted to be energized in series from the current transformer, the applied voltage varying upwardly or downwardly in accordance with upward or downward variations in the network load.

When a control unit embodying the arrangement of Fig. 13 is installed, the installer will disengage lever arm 102 by moving its upper end slightly to the right against the tension of spring 106 to permit cradle 52 and the associated switch 50 to descend to a position known to be somewhat below its correct position. Thereafter, when the network load builds up toward a peak condition, both temperature sensitive elements (44 and 44a) will be heated, causing push rods 46 and 46a to advance gradually in an upward direction. In the course of their ascent push rod 46 engages and actuates button 50a of the switch slightly before push rod 46a engages the set screw 100; thereafter, until the maximum peak is reached, the continued upward movement of push rod 46a will cause an upward displacement of cradle 52 and switch 50, while push rod 46, advancing simultaneously, maintains switch 50 closed. After the peak has passed, both push rods will commence their descent, but the switch and cradle will be retained in their new position by means of the spring-biased lever 102.

Subsequent reoccurrence of peak conditions of the same magnitude on later days will cause no readjustment of the position of switch 50 but on each such occasion push rod 46 will actuate button 50a to close switch 50 for the purpose of interrupting or curtailing auxiliary service as described hereinbefore. Should there be a subsequent peak of greater magnitude, however, push rod 46a again will be effective to lift the switch and re-establish it in a new position higher than the one occupied before. Fundamentally, then, the arrangement of Fig. 13 achieves the same end as the modifications shown in Figs. 8 to 12, inclusive.

Adjustment of set screw 100 makes it possible to vary the distance that must be traveled by push rod 46a after actuation of switch 50 before an upward readjusting thrust will be exerted on cradle 52; this adjustment, in other words, is similar to that made possible by nut 86 (Fig. 10) and collar 88 (Fig. 11). Some additional flexibility in adjustment can be obtained with the arrangement of Fig. 13 through the expedient of giving one of the heating coils (110, 110a) a greater number of turns than the other so that upon upward or downward movement the two push rods (46, 46a) travel at slightly different rates of speed; also, one push rod may be made slightly longer or shorter than the other. If for any reason still more flexibility in the control of movement of the two push rods is desired, heater coils 110 and 110a need not be in series but can be separately energized from the associated current transformer, in which case it is desirable to use a current transformer having a tapped winding to permit differing voltages to be applied to the respective heater coils at the same time.

It thus is obvious that many possible embodiments of my invention may be made without departing from the scope thereof, and it should be understood that all matter herein set forth or shown in the accompanying drawings is to be interpreted as illustrative and not in a limiting sense.

From the description herein given, it will be quite evident that my invention is advantageous both to the electric utility company and to its customers. From the viewpoint of the former, it provides a low-cost practical method and apparatus for enabling the utility to—

(1) Make greater use of existing facilities,
(2) Accelerate the development of the all-electric home,
(3) Create and develop the following fast growing markets for electric energy delivered on a conditionally deferrable or curtailable basis (a) Domestic electric water heating which alone represents a vast market that can be developed quickly and at small expense to the utility,
(b) Electric house heating, complete or supplementary,
(c) Auxiliary heating to be used as a supplement for heat pump systems,
(d) Absorption-type air conditioning systems that do not require large motors, thus minimizing expensive changes in distribution systems, and
(e) Many commercial and industrial applications that can use my "deferred" or "curtailed" service.

(4) Obtain more gross revenue per dollar of invested capital and more net revenue available for dividends to attract capital,
(5) Minimize the trend toward demand type rate structures for large residential customers, which are confusing to the customer and restrictive,
(6) Meet competition of other fuels for many heating purposes.

From the standpoint of the utility's customers, my invention enables the customer to—

(1) Enjoy the benefits of increased electrical living at costs competitive to other energy sources, among which are (a) Cleaner, safer and more healthful heating systems requiring little maintenance or attention,
(b) Safe, automatic and adequate hot water supplies,
(c) Use of heat pumps for heating and cooling in any climate by using my auxiliary service as an energy source for supplementary heat,
(d) Safe, clean and healthful disposition of garbage with an electric incinerator.

(2) Design and build simpler, better and less expensive housing structures in that (a) Electric equipment takes small amount of space,
(b) No basement or fireplace is necessary,
(c) No heat ducts are required for radiation type systems.

(3) Enjoy the benefits of electric heat for many commercial and industrial heating applications.

With the foregoing in mind, it will be seen that my invention is one well adapted to attain all of the ends and objects hereinbefore set forth, together with other advantages which are obvious and which are inherent to the invention.

It will be understood that certain features and subcombinations are of utility and may be employed without reference to other features and subcombinations. This is contemplated by and is within the scope of the appended claims.

Having thus described my invention, I claim:

1. In a distribution system for supplying electrical power to utilization equipment at different consumers' premises, a common feeder having branch lines extending to the different premises, a high-voltage main feeder for supplying power to said common feeder, a step-down transformer having an input connection from its primary winding to said main feeder and an output connection from its secondary winding to said common feeder, a utilization line at one of said premises connected to the branch line at that premises for receiving power therefrom, means including said last branch line and said transformer for normally energizing the utilization line at a voltage which is a predetermined fraction of the main feeder voltage, changeover means operable to reduce the utilization line voltage to a predetermined smaller fraction of the main feeder voltage, a second utilization line at one of said premises normally connected to the branch line at that premises to receive power but having means operable to disconnect same therefrom, and current sensitive means controlled in accordance with the magnitude of the current flowing in said output connection of the transformer for automatically operating said changeover means and said disconnecting means whenever said current flow exceeds a certain value.

2. In a distribution system for supplying electrical power to utilization equipment at different consumers' premises, a common feeder having branch lines extending to the different premises, a high-voltage main feeder for supplying power to said common feeder, a step-down transformer having an input connection from its primary winding to said main feeder and an output connection from its secondary winding to said common feeder, each premises having thereat a primary utilization line always connected to the branch line at that premises for receiving power thereover at a voltage which is a predetermined fraction of the main feeder voltage, at least one of said premises also having a secondary utilization line connected to the branch line for receiving power therefrom at a voltage which normally is a predetermined fraction of the main feeder voltage, changeover means operable to reduce the secondary utilization line voltage to a predetermined smaller fraction of the main feeder voltage, current sensitive means controlled in accordance with the magnitude of the current flowing in said output connection of said transformer for automatically operating said changeover means whenever said current flow exceeds a certain value.

3. In a distribution system for supplying electrical power to utilization equipment at different consumers' premises, a common feeder having branch lines extending to the different premises, a high-voltage main feeder for supplying power to said common feeder, a step-down transformer having an input connection from its primary winding to said main feeder and an output connection from its secondary winding to said common feeder, each premises having thereat a primary utilization line, at least one of said premises also having a secondary utilization line normally connected to the branch line at that premises but having means operable to disconnect same therefrom, current sensitive means controlled in accordance with the magnitude of the current flowing in said output connection of the transformer for automatically operating said disconnecting means whenever said current flow exceeds a certain value, and means maintaining the primary utilization line at each premises connected to the branch line at that premises at all times regardless of whether said secondary utilization line is connected to or disconnected from the branch line at its premises.

4. In a distribution system for supplying electrical power to utilization equipment at different consumers' premises, a common feeder having branch lines extending to the different premises, a high-voltage main feeder for supplying power to said common feeder, a step-down transformer having an input connection from its primary winding to said main feeder and an output connection from its secondary winding to said common feeder, one of said connections including a resistance heating element in series with the associated transformer winding, a utilization line at one of said premises connected to the branch line at that premises for receiving power therefrom, means including said last branch line and said transformer for energizing the utilization line at a voltage which normally is a predetermined fraction of the main feeder voltage, changeover means operable to reduce the utilization line voltage to a predetermined smaller fraction of the main feeder voltage, a second utilization line at one of said premises normally connected to the branch line at that premises to receive power but having means operable to disconnect same therefrom, and temperature sensitive means for automatically operating said changeover means and said disconnecting means in accordance with the heat generated by said heating element.

5. In a distribution system for supplying electrical power to utilization equipment at different consumers' premises, a common feeder having branch lines extending to the different premises, a high-voltage main feeder for supplying power to said common feeder, a step-down transformer having an input connection from its primary winding to said main feeder and an output connection from its secondary winding to said common feeder, one of said connections including a resistance heating element in series with the associated transformer winding, each premises having thereat a primary utilization line always connected to the branch line at that premises for receiving power therefrom at a voltage which is a predetermined fraction of the main feeder voltage, at least one of said premises also having a secondary utilization line connected to the branch line at that premises for receiving power therefrom at a voltage which normally is a predetermined fraction of the main feeder voltage, changeover means operable to reduce the secondary utilization line voltage to a predetermined smaller fraction of the main feeder voltage, and temperature sensitive means for controlling said changeover means in accordance with variations in the heat generated by said resistance heating element.

6. In a distribution system for supplying electrical power to utilization equipment at different consumers' premises, a common feeder having branch lines extending to the different premises, a high-voltage main feeder for supplying power to said common feeder, a step-down transformer having an input connection from its primary winding to said main feeder and an output connection from its secondary winding to said common feeder, one of said connections including a resistance heating element in series with the associated transformer winding, each premises having thereat a primary utilization line, at least one of said premises also having a secondary utilization line normally connected to the branch line at that premises but having means operable to disconnect same therefrom, and temperature sensitive means for controlling said disconnecting means in accordance with variations in the heat generated by said resistance heating element.

7. In a distribution system for supplying electrical power to utilization equipment at different consumers' premises, a common feeder having branch lines extending to the different premises, a high-voltage main feeder for supplying power to said common feeder, a step-down distribution transformer having an input connection from its primary winding to said main feeder and an output connection from its secondary winding to said common feeder, a current transformer on said last connection whereby the output of said current transformer is influenced by power drawn from the primary feeder by said common feeder, a utilization line at one of said premises connected to the branch line at that premises for receiving power therefrom, means including said last branch line and said distribution transformer for normally energizing the utilization line at a voltage which is a predetermined fraction of the main feeder voltage, changeover means operable to reduce the utilization line voltage to a predetermined smaller fraction of the main feeder voltage, a second utilization line at one of said premises normally connected to the branch line at that premises to receive power but having means operable to disconnect same therefrom, and means controlled by the output of said current transformer for automatically operating said changeover means and said disconnecting means whenever said output exceeds a certain valve.

8. In a distribution system for supplying electrical power to utilization equipment at different consumers' premises, a common feeder having branch lines extending to the different premises, a high-voltage main feeder for supplying power to said common feeder, a step-down transformer having an input connection from its primary winding to said main feeder and an output connection from its secondary winding to said common feeder, a current transformer on said last connection whereby the output of said current transformer is influenced by power drawn from the primary feeder by said common feeder, each premises having thereat a primary utilization line always connected to the branch line at that premises for receiving power therefrom at a voltage which is a predetermined fraction of the main feeder voltage, at least one of said premises also having a secondary utilization line connected to the branch line at that premises for receiving power therefrom at a voltage which normally is a predetermined fraction of the main feeder voltage, changeover means operable to reduce the secondary utilization line voltage to a predetermined smaller fraction of the main feeder voltage, and means controlled by the output of said current transformer for automatically operating said changeover means whenever such output exceeds a certain value.

9. In a distribution system for supplying electrical power to utilization equipment at different consumers' premises, a common feeder having branch lines extending to the different premises, a high-voltage main feeder for supplying power to said common feeder, a step-down transformer having an input connection from its primary winding to said main feeder and an output connection from its secondary winding to said common feeder, a current transformer on said last connection whereby the output of said current transformer is influenced by power drawn from the primary feeder by said common feeder, each premises having thereat a primary utilization line, at least one of said premises also having a secondary utilization line normally connected to the branch line at that premises but having means operable to disconnect same therefrom, means controlled by the output of said current transformer for automatically operating said disconnecting means whenever such output exceeds a certain value, and means maintaining the primary utilization line at each premises connected to the branch line at that premises at all times regardless of whether said secondary utilization line is connected to or disconnected from the branch line at its premises.

10. In a distribution system for supplying electrical power to utilization equipment at different consumers' premises, a common feeder having branch lines extending to the different premises, a main feeder connected to said common feeder for supplying power thereto, heat generating means constructed and arranged to have a heat output that varies in accordance with variations in the power load imposed on said main feeder by said common feeder, a utilization line at one of said premises connected to the branch line at that premises for receiving power therefrom, means including said last branch line for energizing the utilization line at a voltage which normally is a predetermined fraction of the main feeder voltage, changeover means operable to reduce the utilization line voltage to a predetermined smaller fraction of the main feeder voltage, a second utilization line at one of said premises normally connected to the branch line at that premises to receive power but having means operable to disconnect same therefrom, a temperature sensitive element, means for automatically operating said changeover means and said disconnecting means whenever the temperature of said element exceeds a predetermined value, and means for subjecting said element to the combined action of outdoor ambient temperature and the heat output of said generating means.

11. In a distribution system for supplying electrical power to utilization equipment at different consumers' premises, a common feeder having branch lines extending to the different premises, a main feeder connected to said common feeder for supplying power thereto, heat generating means constructed and arranged to have a heat output that varies in accordance with variations in the power load imposed on said main feeder by said common feeder, each premises having thereat a primary utilization line connected to the branch line at that premises for receiving power therefrom at a voltage which is a predetermined fraction of the main feeder voltage, one of said premises also having a secondary utilization line connected to the branch line at that premises for receiving power therefrom at a voltage which normally is a predetermined fraction of the main feeder voltage, changeover means operable to reduce the secondary utilization line voltage, a temperature sensitive element, means controlled by said element for automatically operating said changeover means whenever the temperature of said element exceeds a predetermined value, and means for subjecting said element to the combined action of the outdoor ambient temperature and the heat output of said generating means.

12. In a distribution system for supplying electrical power to utilization equipment at different consumers' premises, a common feeder having branch lines extending to the different premises, a main feeder connected to said common feeder for supplying power thereto, heat generating means constructed and arranged to have a heat output that varies in accordance with variations in the power load imposed on said main feeder by said common feeder, each premises having thereat a primary utilization line, at least one of said premises also having a secondary utilization line normally connected to the branch line at that premises but having means operable to disconnect same therefrom, a temperature sensitive element, means controlled by said element for automatically operating said disconnecting means whenever the temperature of said element exceeds a predetermined value, and means for subjecting said element to the combined action of outdoor ambient temperature and the heat output of said generating means.

13. In a distribution system for supplying electrical power to utilization equipment at different consumers' premises, a common feeder having branch lines extending to the different premises, a main feeder connected to said common feeder for supplying power thereto, a utilization line at one of said premises connected to the branch lines at that premises for receiving power therefrom, means including said last branch line for normally energizing the utilization line at a voltage which is a predetermined fraction of the main feeder voltage, changeover means operable to reduce the utilization line voltage to a predetermined smaller fraction of the main feeder voltage, a second utilization line at one of said premises normally connected to the branch line at that premises to receive power but having means operable to disconnect same therefrom, a temperature sensitive element, means controlled by said element for automatically operating said changeover means and said disconnecting means whenever the temperature of said element exceeds a predetermined value, and means for exposing said element to the action of the outdoor ambient temperature.

14. In a distribution system for supplying electrical power to utilization equipment at different consumers' premises, a common feeder having branch lines extending to the different premises, a main feeder connected to said common feeder for supplying power thereto, each premises having thereat a primary utilization line connected to the branch line at that premises for receiving power therefrom at a voltage which is a predetermined fraction of the main feeder voltage, one of said premises also having a secondary utilization line connected to the branch line for receiving power therefrom at a voltage which normally is a predetermined fraction of the main feeder voltage, changeover means operable to reduce the utilization line voltage to a predetermined smaller fraction of the main feeder voltage, a temperature-sensitive element, means controlled by said element for automatically operating said changeover means whenever the temperature of said element exceeds a predetermined value, and means for subjecting said element to the action of the outdoor ambient temperature.

15. In a distribution system for supplying electrical power to utilization equipment at different consumers' premises, a common feeder having branch lines extending to the different premises, a main feeder connected to said common feeder for supplying power thereto, each premises having thereat a primary utilization line, at least one of said premises also having a secondary utilization line normally connected to the branch line at that premises but having means operable to disconnect same therefrom, a temperature sensitive element, means controlled by said element for automatically operating said disconnecting means whenever the temperature of said element exceeds a predetermined value, and means for subjecting said element to the action of the outdoor ambient temperature.

16. In a distribution system for supplying electrical power to utilization equipment at different consumers' premises, a common feeder having branch lines extending to the different premises, a main feeder connected to said common feeder for supplying power thereto, a utilization line at one of said premises connected to the branch line at that premises for receiving power therefrom, means including said last branch line for energizing the utilization line at a voltage which normally is a predetermined fraction of the main feeder voltage, changeover means operable to reduce the utilization line voltage to a predetermined smaller fraction of the main feeder voltage, a second utilization line at one of said premises normally connected to the branch line at that premises to receive power but having means operable to disconnect same therefrom, a temperature sensitive element, means for heating said element variably in accordance with variations in the power load imposed on said main feeder by said common feeder, means for automatically operating said changeover means and said disconnecting means whenever the temperature of said element exceeds a predetermined value, and adjustment means for varying said predetermined temperature value.

17. In a distribution system for supplying electrical power to utilization equipment at different consumers' premises, a common feeder having branch lines extending to the different premises, a main feeder connected to said common feeder for supplying power thereto, each premises having thereat a primary utilization line connected to the branch line at that premises for receiving power therefrom at a voltage which is a predetermined fraction of the main feeder voltage, one of said premises also having a secondary utilization line connected to the branch line at that premises for receiving power therefrom at a voltage which normally is a predetermined fraction of the main feeder voltage, changeover means operable to reduce the secondary utilization line voltage to a predetermined smaller fraction of the main feeder voltage, a temperature sensitive element, means for heating said element variably in accordance with variations in the power load imposed on said main feeder by said common feeder, means controlled by said element for automatically operating said changeover means whenever the temperature of said element exceeds a predetermined value, and adjustment means for varying said predetermined temperature value.

18. In a distribution system for supplying electrical power to utilization equipment at different consumers' premises, a common feeder having branch lines extending to the different premises, a main feeder connected to said common feeder for supplying power thereto, each premises having thereat a primary utilization line, at least one of said premises also having a secondary utilization line normally connected to the branch line at that premises but having means operable to disconnect same therefrom, means maintaining the primary utilization line at each premises connected to the branch line at that premises at all times regardless of whether said secondary utilization line is connected to or disconnected from the branch line at its premises, a temperature sensitive element, means for heating said element variably in accordance with variations in the power load imposed on said main feeder by said common feeder, means controlled by said temperature sensitive element for automatically operating said disconnecting means whenever the temperature of said element exceeds a predetermined value, and adjustment means for varying said predetermined temperature value.

19. In a distribution system for supplying electrical power to utilization equipment at different consumers' premises, a common feeder having branch lines extending to the different premises, a high-voltage main feeder for supplying power to said common feeder, a step-down transformer having leads connecting its primary winding to said main feeder and other leads connecting its secondary winding to said common feeder, one of said leads containing a resistance element, a temperature sensitive element adjacent to said resistance element in a position to be heated thereby, a housing enclosure around the two elements, a member mounted for movement relative to said housing and controlled by said temperature sensitive element to register any change in the temperature thereof by a movement corresponding in amount and direction to that of the temperature change, an electrical switch carried on said housing in a position to be engaged and actuated by said member upon predetermined movement of the latter in a given direction, a utilization line at one consumer's premises connected to the branch line at that premises for receiving power therefrom, means including said last branch line for normally energizing the utilization line at a voltage which is a predetermined fraction of the main feeder voltage, and changeover means controlled by said switch to reduce the utilization line voltage responsive to actuation of the switch.

20. In a distribution system for supplying electrical power to utilization equipment at different consumers' premises, a common feeder having branch lines extending to the different premises, a high voltage main feeder for supplying power to said common feeder, a step-down transformer having leads connecting its primary winding to said main feeder and other leads connecting its secondary winding to said common feeder, one of said leads containing a resistance element, a temperature sensitive element adjacent said resistance element in a position to be heated thereby, a housing enclosure around the two elements, a member mounted for movement relative to said housing and controlled by said temperature sensitive element to register any change in the temperature thereof by a movement corresponding in amount and direction to that of the temperature change, and an electrical switch carried on said housing in a position to be engaged and actuated by said member upon predetermined movement of the latter in a given direction.

21. A distribution system as in claim 20 wherein said switch is bodily adjustable in position relative to said housing to vary the distance that said member is required to travel in order to actuate the switch.

22. A distribution system as in claim 20 wherein said enclosure is positioned in close proximity to said transformer and has its exterior substantially wholly exposed to the ambient air.

23. A distribution system as in claim 22 wherein said enclosure has a thermal insulation barrier between said elements and the ambient air.

24. In a distribution system for supplying electrical power to utilization equipment at different consumers' premises, a common feeder having branch lines extending to the different premises, a high voltage main feeder for supplying power to said common feeder, a step-down transformer having leads connecting its primary winding to said main feeder and other leads connecting its secondary winding to said common feeder, a current transformer on at least one of said leads, a housing carried by said current transformer, a resistance element in said housing connected to a winding of said current transformer to be energized thereby, a temperature sensitive element in said housing in heat-receiving relation to said resistance element, a member mounted for movement relative to said housing and controlled by said temperature sensitive element to register any change in the temperature thereof by a movement corresponding in amount and direction to that of the temperature change, and an electrical switch carried on said housing in a position to be engaged and actuated by said member upon predetermined movement of the latter in a given direction.

25. A distribution system as in claim 24 wherein said switch is bodily adjustable in position relative to said housing to vary the distance said member is required to travel in order to actuate the switch.

26. A distribution system as in claim 24 wherein said housing is positioned in close proximity to said step-down transformer and has its exterior substantially wholly exposed to the ambient air.

27. A distribution system as in claim 26 wherein said housing has a thermal insulation barrier between said elements and the ambient air.

28. In a distribution system for supplying electrical power to utilization equipment at different consumers' premises, a common feeder having branch lines extending to the different premises, a high voltage main feeder for supplying power to said common feeder, a step-down transformer having leads connecting its primary winding to said main feeder and other leads connecting its secondary winding to said common feeder, a housing located in close proximity to said transformer with its exterior substantially wholly exposed to the ambient air, a resistance element within said housing coupled with certain of said leads to be variably energized in accordance with the current flow therethrough, a temperature sensitive element within said housing in heat-receiving relation to said resistance element, a member mounted for movement relative to said housing and controlled by said temperature sensitive element to register any change in the temperature thereof by a movement corresponding in amount and direction to that of the temperature change, and an electrical switch carried on said housing in a position to be engaged and actuated by said member upon predetermined movement of the latter in a given direction.

29. In a device of the character described, a temperature sensitive element having a cylindrical barrel and a coaxial push rod constructed and arranged to register any change in the temperature of the barrel by an axial movement corresponding in amount and direction to that of the temperature change, a housing around said barrel and containing a pair of apertures, a pair of connector terminals each fixedly positioned within the housing adjacent to one of said apertures for receiving a wire inserted into the housing through the aperture, a resistance heating element within the housing having its ends connected to the respective terminals, and an electrical switch carried on the housing in a position to be engaged and actuated by said push rod on predetermined movement of the latter in a given direction.

30. A device as in claim 29 wherein the medial portion of said heating element comprises a strip of metal extending axially of said barrel along one side thereof, said strip being arcuate in transverse cross section to conform with the curvature of the barrel.

31. In a device of the character described, a temperature sensitive element having a cylindrical barrel and a coaxial push rod constructed and arranged to register any change in the temperature of the barrel by an axial movement corresponding in amount and direction to that of the temperature change, a housing around said barrel, a current transformer secured to the exterior of said housing, a resistance heating element within the housing and having its ends connected to the terminals of said current transformer, and an electrical switch carried on the housing in a position to be engaged and actuated by said push rod upon predetermined movement of the latter in a given direction.

32. A device as in claim 31 wherein said heating element comprises a helix encircling said barrel.

33. In a device of the character described, a frame, a member mounted on said frame for limited movement in a predetermined direction relative to the frame, yieldable spring-biasing means always urging said member in the opposite direction, a one-way positioning device between said member and frame always preventing movement of said member in said last direction while permitting movement thereof in said first direction, a snap-acting switch carried by said member and having an actuator movable in said first direction relative to said member to operate said switch, said actuator being constructed and arranged to have limited over-travel in said first direction after operation of said switch, a push rod having its axis generally aligned with the direction of movement of said member and its end normally spaced from said actuator, said rod being temperature-controlled to at times advance axially toward said actuator, and said member having an element positioned to be engaged by said end of the push rod upon predetermined over-travel of said actuator whereby a continued advance of said rod will displace said member in said first direction against the force of said biasing means.

34. A device as in claim 33 wherein said element is adjustable relative to said member to vary the distance which said push rod must travel after engaging said actuator and before engaging said element.

35. In a device of the character described, a frame, a member mounted on said frame for limited movement in a predetermined direction relative the frame, yieldable spring biasing means always urging said member in the opposite direction, a one-way positioning device between said member and frame always preventing movement of said member in said last direction while permitting movement thereof in said first direction, a snap acting switch carried by said member and having an actuator movable in said first direction relative to said member to operate said switch, said actuator being constructed and arranged to have limited over-travel in said first direction after operation of said switch, a push rod having its axis generally aligned with the direction of movement of said member and its end normally spaced from said actuator, said rod being temperature-controlled to at times advance axially in a direction to close said space, and said push rod having an element positioned thereon to engage said member upon predetermined over-travel of said actuator whereby a continued advance of said rod will displace said member in said first direction against the force of said biasing means.

36. A device as in claim 35 wherein said element is adjustable relative to said push rod to vary the distance that must be traveled by said push rod after engaging said actuator and before said element engages said member.

37. In a device of the character described, a member movable in a predetermined path, means for moving said member forwardly and rearwardly in said path between variable end positions, a support, a body mounted on said support for adjustment to different set positions along said path, means for holding said body in set position when thus adjusted, an element movably mounted on said body in the path of the forward travel of said member whereby said element is adapted to be engaged by said member and displaced relative to said body whenever the forward travel of the member brings it to a point corresponding to the set position of the body, said body comprising a switch constructed and arranged to operate responsive to predetermined displacement of said element, means whereby said member imposes a thrust on said body to shift same to a new set position whenever said member continues to advance more than a predetermined distance after operation of said switch, and said holding means normally being effective on subsequent rearward movement of said member to retain said body substantially in said new set position whereby said switch thereafter will be operated by said member only upon forward travel of the latter beyond the point at which operation of the switch previously occurred.

38. In a device of the character described, a member movable in a predetermined path, means for moving said member forwardly and rearwardly in said path between variable end positions, a support, a switch mounted on said support for bodily adjustment to different set positions along said path, said switch having circuit controlling means operated by said member whenever the latter is in a position substantially corresponding to the set position of said switch, and means at times controlled by said member as it approaches the limit of its movement in a given direction along said path for shifting said switch bodily from one set position to another.

39. In a device of the character described, a member movable in a predetermined path, temperature controlled means for moving said member forwardly and rearwardly in said path between variable end positions, a support, a switch mounted on said support for bodily adjustment to different set positions along said path, means on said switch for at times receiving thrust from said member during a portion of its movement in a forward direction along said path thereby to shift said switch bodily from one set position to another, means for holding said switch in any position to which it has thus been reset, and said switch having circuit controlling means operated by said member whenever the latter is in a position substantially corresponding to the set position of said switch.

40. In a device of the character described, a member movable in a predetermined path, temperature controlled means for moving said member forwardly and rearwardly in said path between variable end positions, a switch having a body and an actuator movably mounted on said body for operating the switch, means normally holding said switch body in a set position relative to said path, said position being such that said member will engage said actuator and operate said switch at a particular point in its forward travel along the path, means whereby said member imposes a thrust on said switch body to shift same to a new set position relative to said path whenever said member continues to advance more than a predetermined distance after operating the switch, and said holding means normally being effective on subsequent rearward movement of said member to retain said switch body substantially in said new position whereby said switch thereafter will be operated by said member only upon forward travel of the latter beyond the point at which operation of the switch previously occurred.

No references cited.